(12) United States Patent
Chen

(10) Patent No.: US 12,128,532 B2
(45) Date of Patent: Oct. 29, 2024

(54) UNIVERSAL JOINT

(71) Applicant: INFAR INDUSTRIAL CO., LTD., Chang-Hua County (TW)

(72) Inventor: Tai Hung Chen, Chang-Hua County (TW)

(73) Assignee: INFAR INDUSTRIAL CO., LTD., Chang-Hua County (TW)

( * ) Notice: Subject to any disclaimer, the term of this patent is extended or adjusted under 35 U.S.C. 154(b) by 425 days.

(21) Appl. No.: 17/536,214

(22) Filed: Nov. 29, 2021

(65) Prior Publication Data
US 2022/0241938 A1    Aug. 4, 2022

(30) Foreign Application Priority Data
Feb. 3, 2021 (TW) .................................. 110104052

(51) Int. Cl.
*B25B 23/00* (2006.01)
*F16D 3/38* (2006.01)

(52) U.S. Cl.
CPC ............ *B25B 23/0014* (2013.01); *F16D 3/38* (2013.01)

(58) Field of Classification Search
CPC ......... B25B 23/0014; F16D 3/16; F16D 3/26; F16D 3/38; Y10T 403/32041; Y10T 403/32181
USPC ..................... 464/119, 136, 147; 403/57, 74; 81/177.75
See application file for complete search history.

(56) References Cited

U.S. PATENT DOCUMENTS

| | | | | |
|---|---|---|---|---|
| 3,691,788 A | * | 9/1972 | Mazziotti | ............ B25B 23/0014 464/139 |
| 6,971,292 B2 | * | 12/2005 | Hu | ........................ B25B 13/481 81/177.85 |
| 8,151,671 B2 | * | 4/2012 | Chen | ................... B25B 23/0014 464/119 |
| 9,242,366 B2 | * | 1/2016 | Liu | ........................ B25G 1/066 |
| 9,452,515 B2 | * | 9/2016 | Lee | ..................... B25B 23/0028 |
| 11,098,765 B2 | * | 8/2021 | Yu | ........................ B25B 23/0014 |
| 11,331,776 B2 | | 5/2022 | Su | |
| 2004/0261586 A1 | | 12/2004 | Chen | |
| 2005/0229752 A1 | * | 10/2005 | Nickipuck | .......... B25B 23/0014 81/177.75 |
| 2009/0041535 A1 | * | 2/2009 | Hu | ............................ F16D 3/40 403/57 |

(Continued)

FOREIGN PATENT DOCUMENTS

| | | |
|---|---|---|
| CN | 209470848 U | 10/2019 |
| CN | 113294461 A | 8/2021 |

(Continued)

*Primary Examiner* — Josh Skroupa
(74) *Attorney, Agent, or Firm* — Muncy, Geissler, Olds & Lowe, P.C.

(57) ABSTRACT

A universal joint includes a first joint member having a first end to which a second joint member is coupled and a second end to which a third joint member is coupled. The first and the second joint members are pivotally connected with each other about a first axis of rotation. The first and third joint member are pivotally connected with each other about a second axis of rotation. A retaining device which includes a first resilient member and a first retainer working cooperatively for preventing inadvertent relative movements between the first and the second joint members. The first retainer is urged by the first resilient member.

19 Claims, 14 Drawing Sheets

(56) References Cited

U.S. PATENT DOCUMENTS

2020/0306937 A1   10/2020  Su
2021/0156434 A1*  5/2021  Yu ..................... B25B 23/0014
2021/0301880 A1*  9/2021  Su ............................ F16D 3/38

FOREIGN PATENT DOCUMENTS

| DE | 202014106211 U1 * | 2/2015 | ......... B25B 23/0014 |
| FR | 840074 A * | 4/1939 | ......... B25B 23/0014 |
| TW | 318421 U | 10/1997 | |
| TW | I481480 B | 4/2015 | |
| TW | I589409 B | 7/2017 | |

* cited by examiner

UNIVERSAL JOINT

BACKGROUND OF THE INVENTION

1. Field of the Invention

The present invention relates to a joint and, particularly, to a universal joint.

2. Description of the Related Art

TW Pat. No. 1589409 shows a universal joint for a driving tool. The universal joint includes a body and two rotatable heads respectively provided at two opposite ends of the body. Each head is pivotally connected to a link piece which is pivotally connected to the body. The head is pivotal with respect to the link piece about a first pivotal axis and the body is pivotal with respect to the link piece about a second pivotal axis. It is, however, difficult to control a rotational direction of the head with respect to the body and avoid an inadvertent relative rotational movement.

The present invention is, therefore, intended to obviate or at least alleviate the problems encountered in the prior art.

SUMMARY OF THE INVENTION

According to the present invention, a universal joint includes a first joint member having a first end to which a second joint member is coupled and a second end to which a third joint member is coupled. The first and the second joint members are pivotally connected with each other about a first axis of rotation. The first and third joint member are pivotally connected with each other about a second axis of rotation. A retaining device which includes a first resilient member and a first retainer working cooperatively for preventing inadvertent relative movements between the first and the second joint members. The first retainer is urged by the first resilient member There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing other structures, methods and systems for carrying out the several purposes of the present invention. It is important, therefore, that the claims be regarded as including such equivalent constructions insofar as they do not depart from the spirit and scope of the present invention.

Further, the purpose of the abstract is to enable the public generally, and especially scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
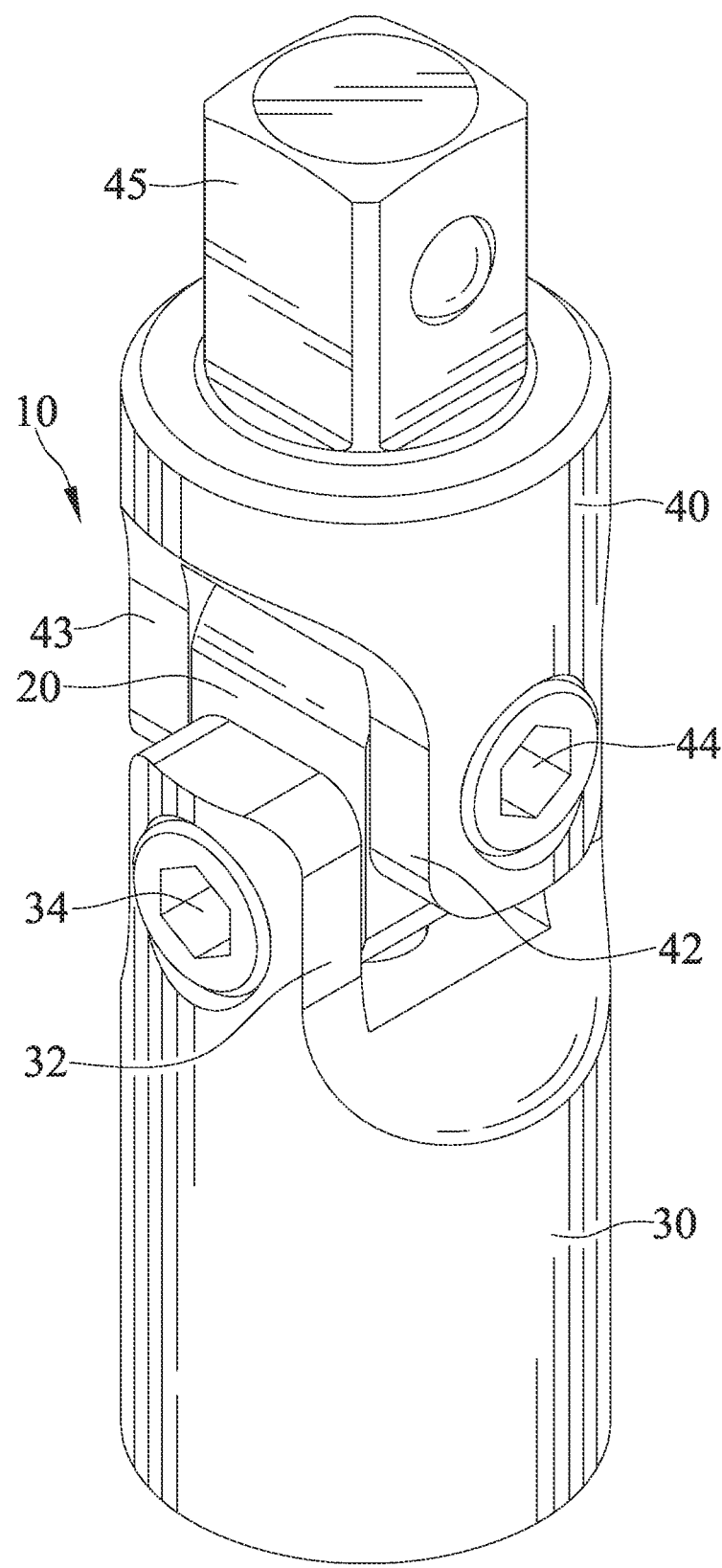
FIG. 1 is a perspective view of a universal joint in accordance with a first embodiment of the present invention.
Figure 2:
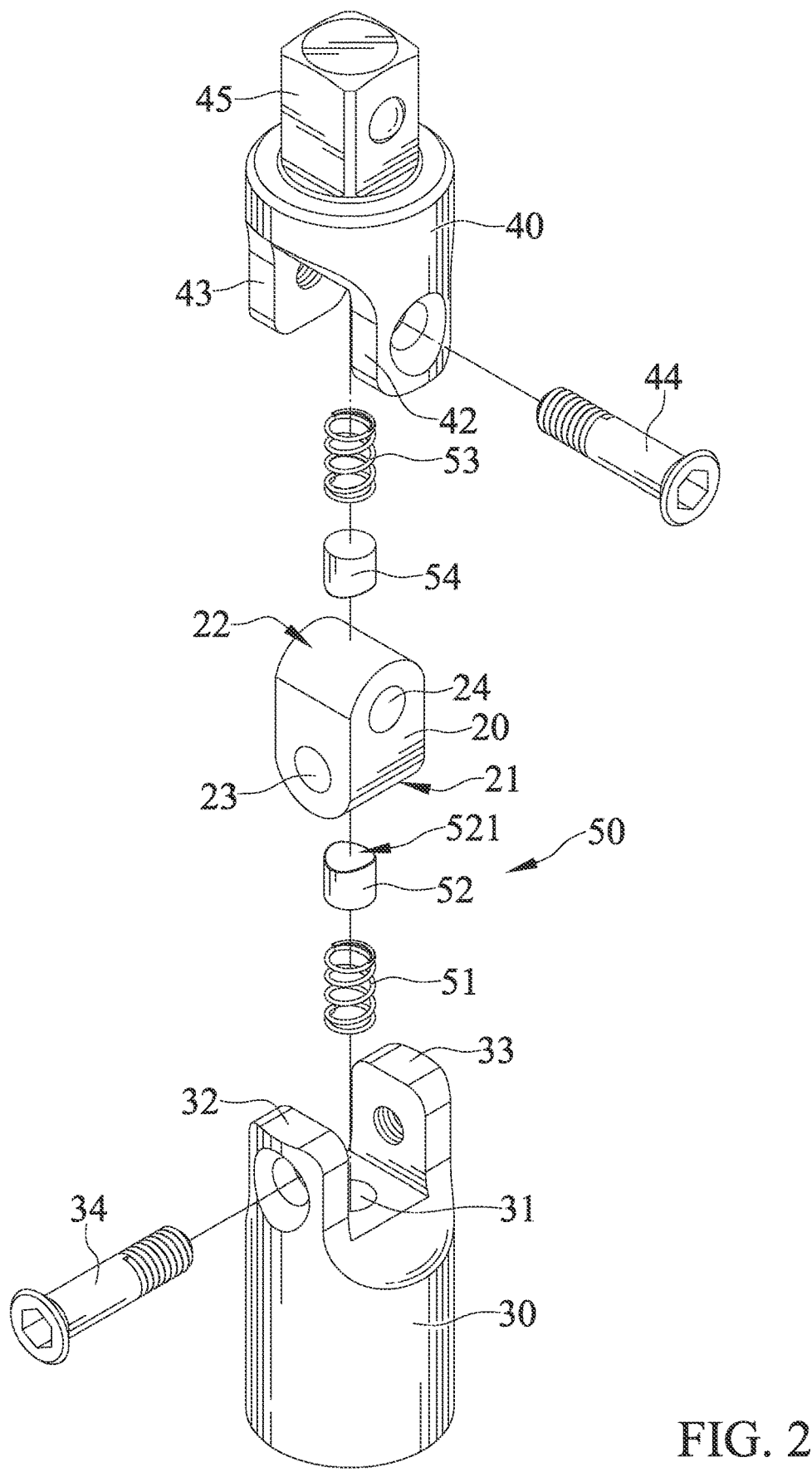
FIG. 2 is an exploded view of the universal joint of FIG. 1.
Figure 3:
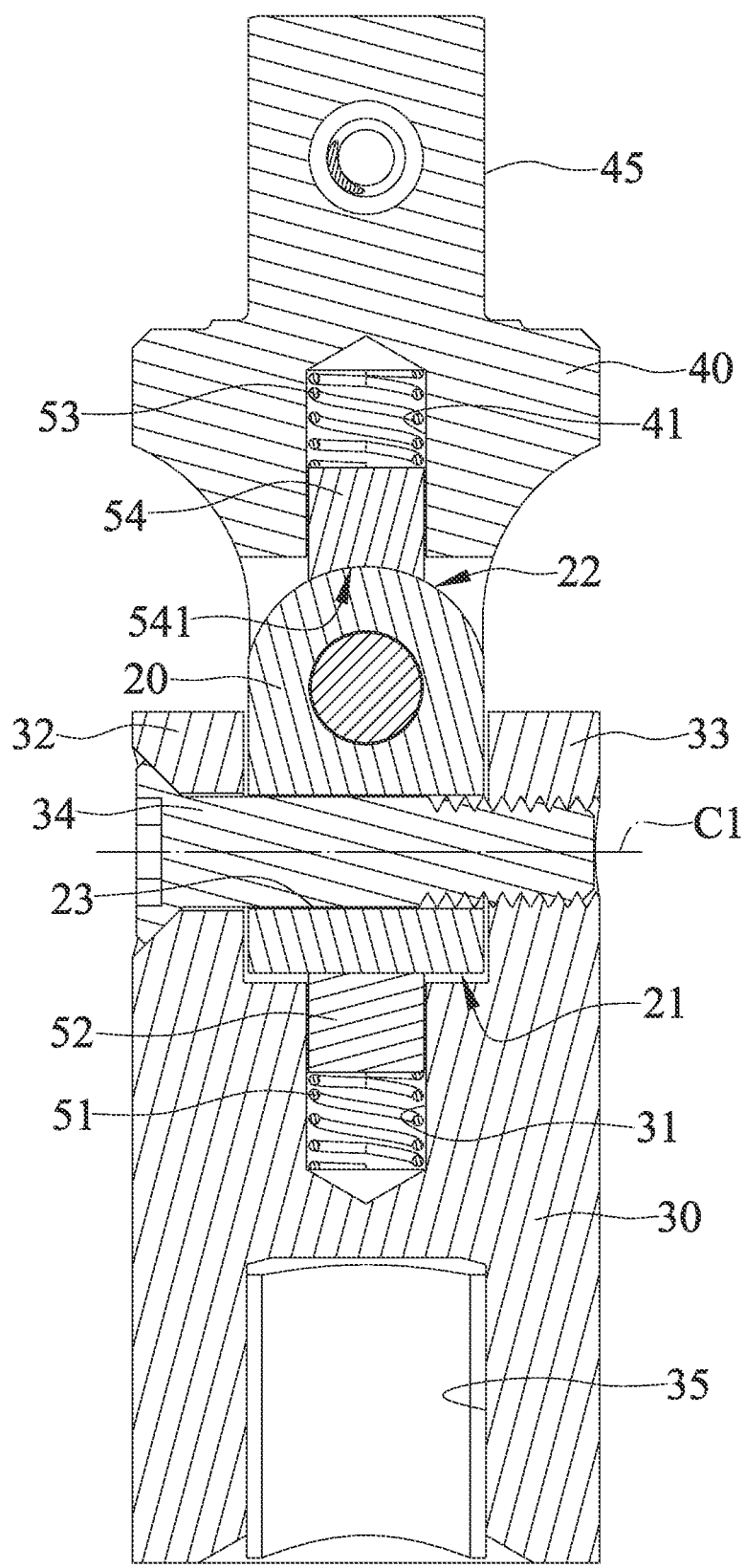
FIG. 3 is a cross-sectional view of the universal joint of FIG. 1.
Figure 4:
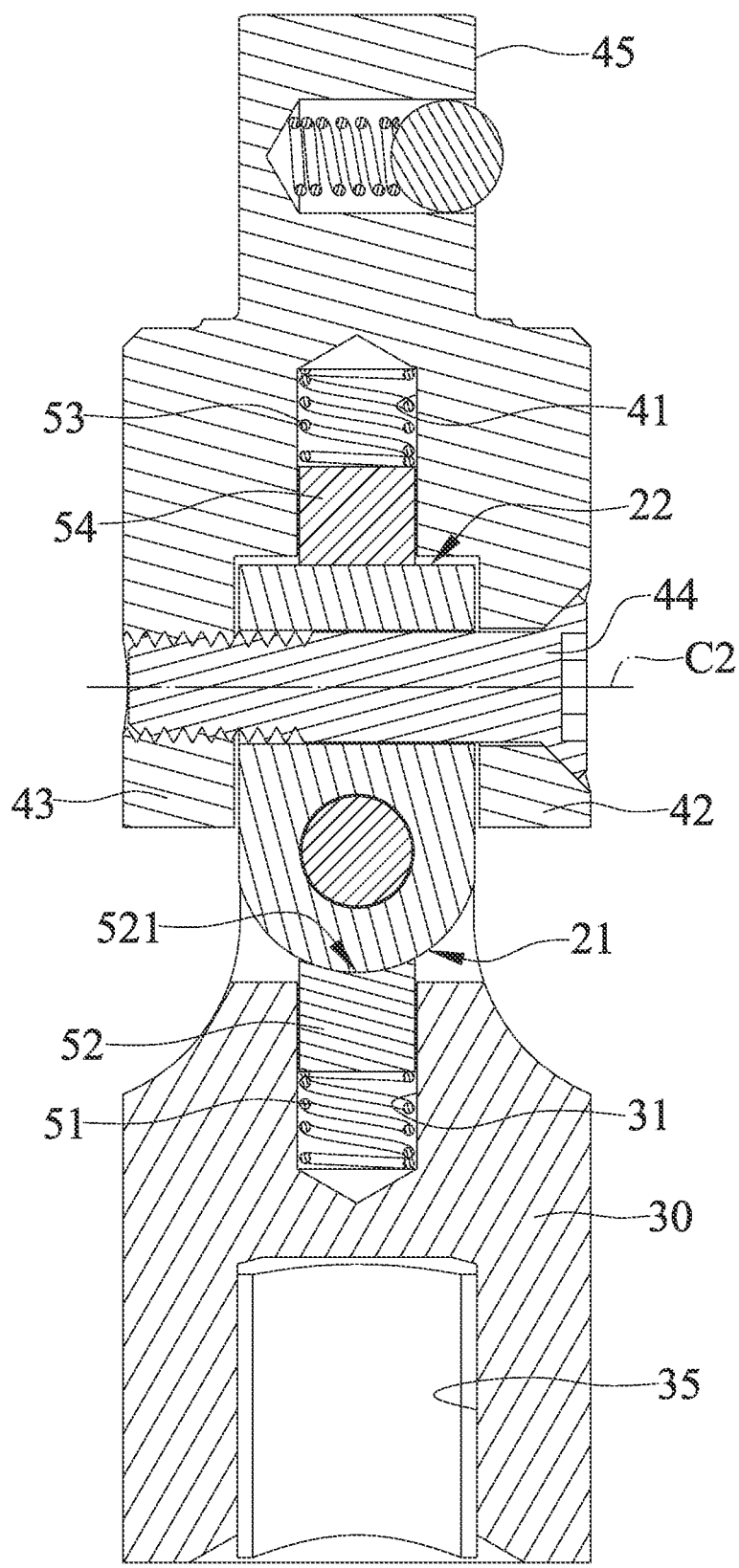
FIG. 4 is another cross-sectional view of the universal joint of FIG. 1.
Figure 5:
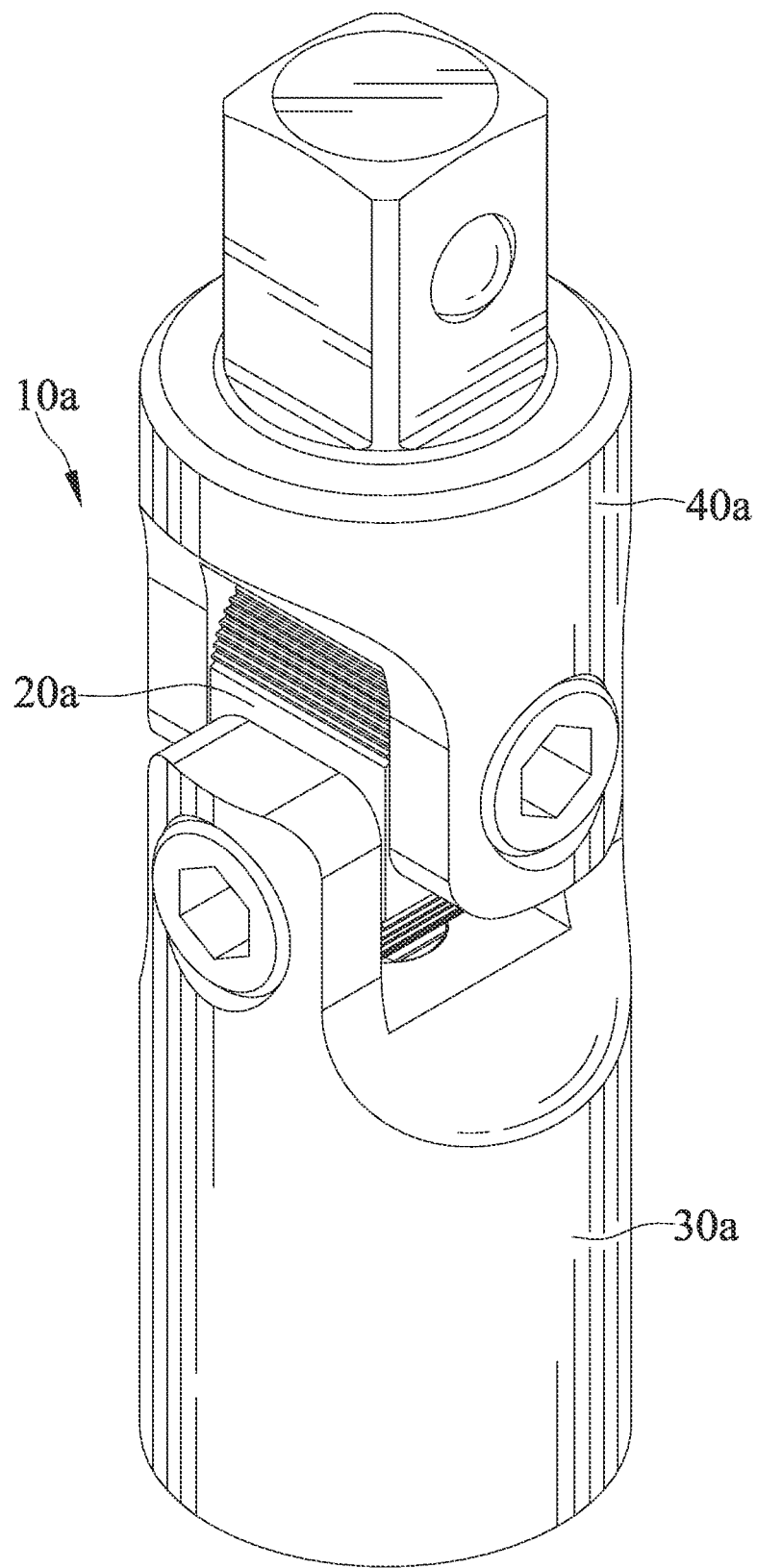
FIG. 5 a perspective view of a universal joint in accordance with a second embodiment of the present invention.
Figure 6:
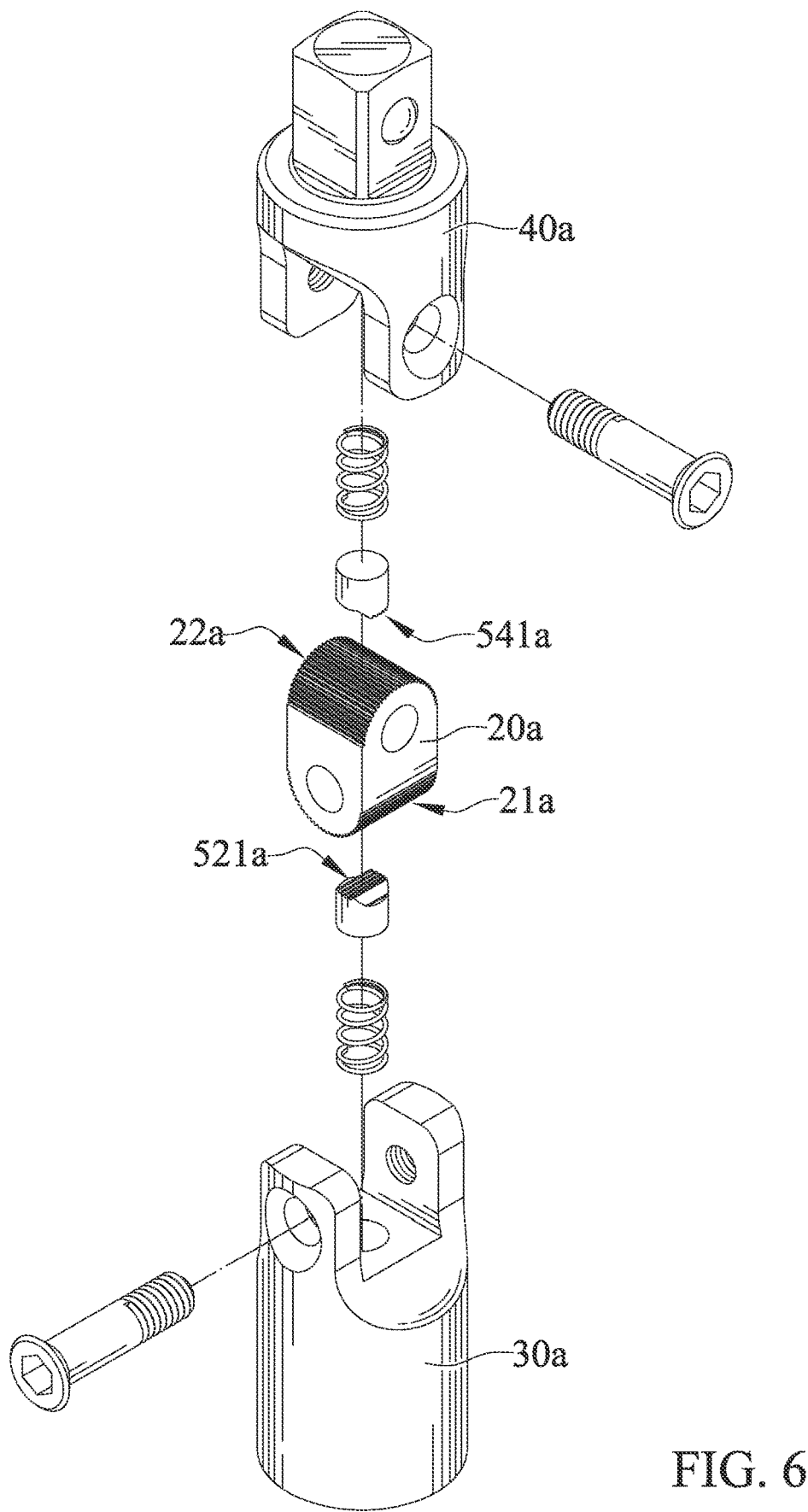
FIG. 6 an exploded view of the universal joint of FIG. 5.
Figure 7:
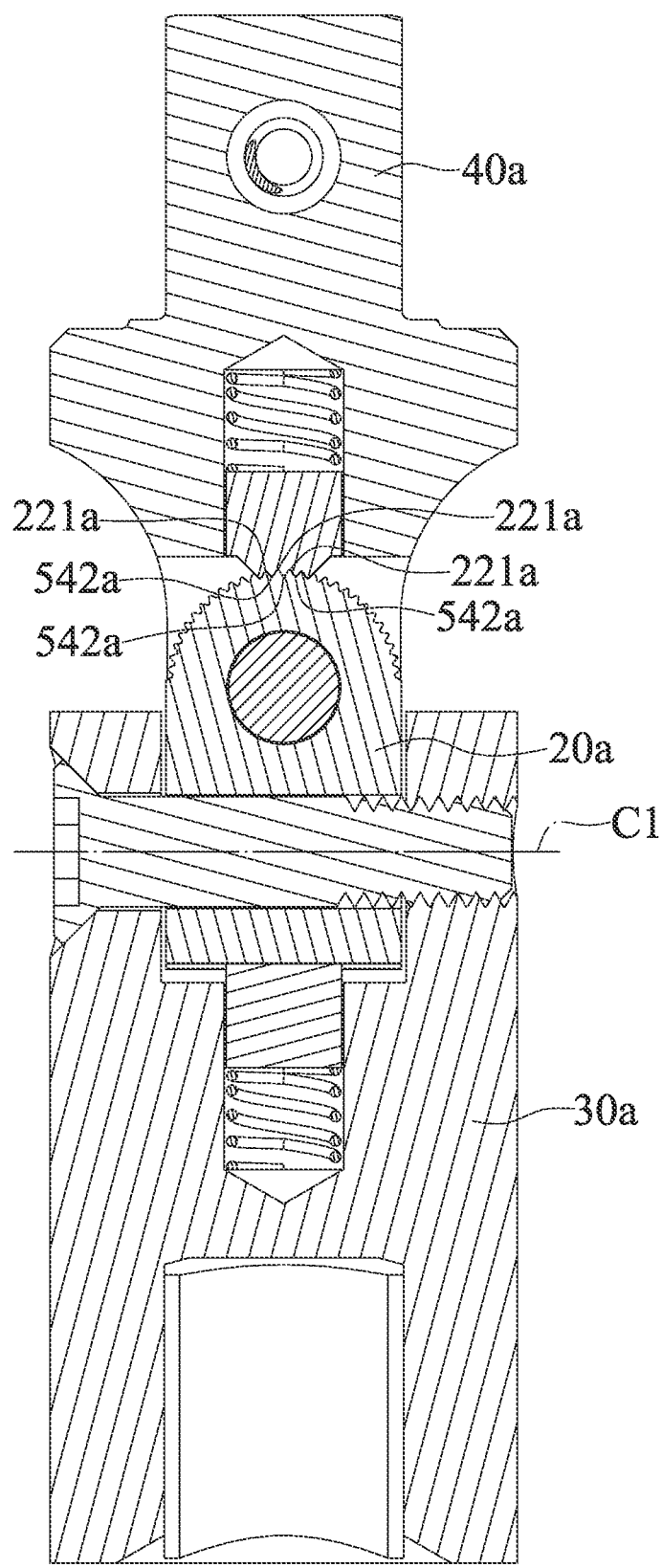
FIG. 7 is a cross-sectional view of the universal joint of FIG. 5.
Figure 8:
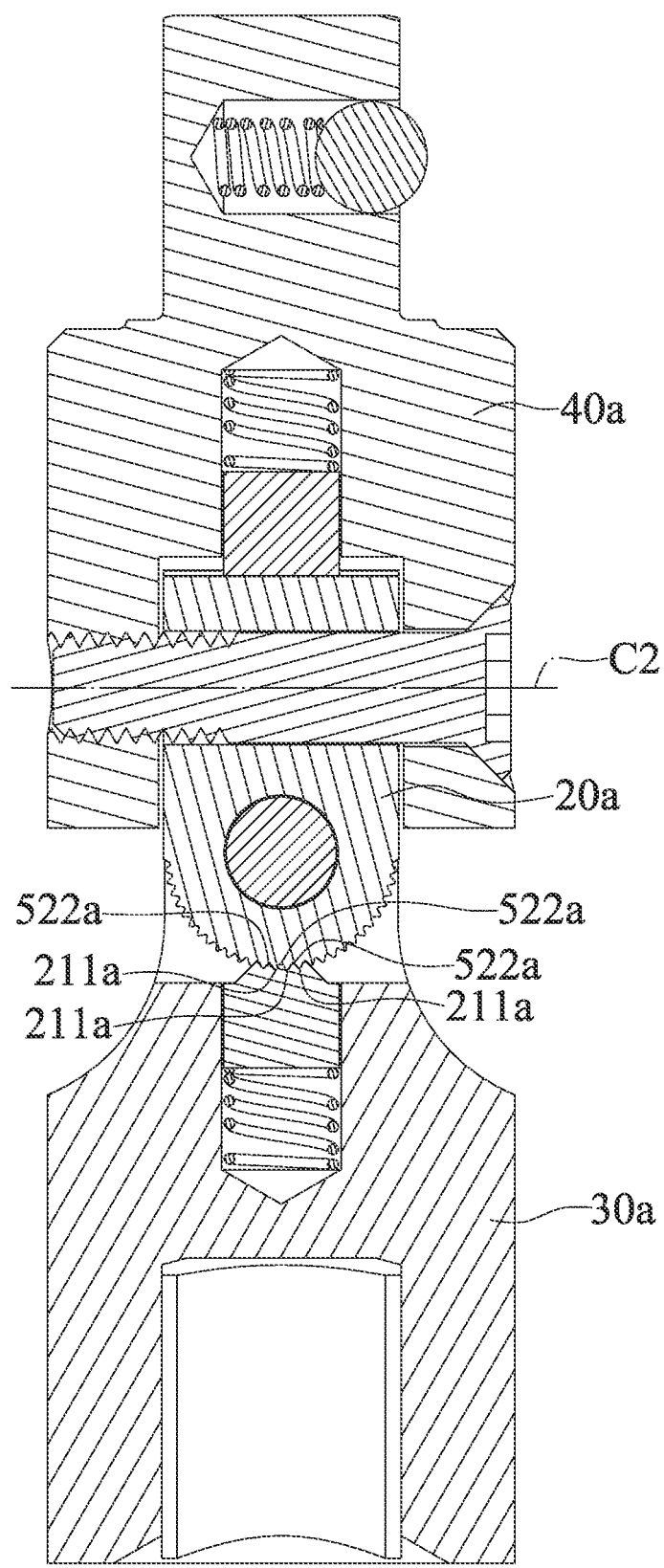
FIG. 8 is another cross-sectional view of the universal joint of FIG. 5.

FIGS. 1-4 show a universal joint 10 in accordance with a first embodiment of the present invention. The universal joint 10 includes a first joint member 20 having a first end to which a second joint member 30 is coupled and a second end to which a third joint member 40 is coupled. The second and the third joint members 30 and 40 are on opposite ends of the first joint member 20. The first and the second joint members 20 and 30 are pivotally connected with each other about a first axis of rotation C1. The first and the third joint member 20 and 40 are pivotally connected with each other about a second axis of rotation C2. The first and the second axes of rotation C1 and C2 extend on the first joint member 20 at different heights and in different directions. The first and the second joint members 20 and 30 include a first pivot 34, which inserts in a first hole 23 which extends along the first axis of rotation C1, connected therewith. The first and the third joint members 20 and 40 include a second pivot 44, which inserts in a second hole 24 which extends along the second axis of rotation C2, connected therewith. The second joint member 30 has two lugs 32 and 33 and the first joint member 20 is disposed between the lugs 32 and 33. The first pivot 34 is inserted through one of two lugs 32 and 33, the first joint member 20, and into the other of two lugs 32 and 33. The second joint member 30 has two lugs 42 and 43 and the first joint member 20 is disposed between the lugs 42 and 43. The second pivot 44 is inserted through one of two lugs 42 and 43, the first joint member 20, and into the other of two lugs 42 and 43.

A retaining device 50 which includes a first resilient member 51 and a first retainer 52 working cooperatively for preventing inadvertent relative movements between the first and the second joint members 20 and 30. The first retainer 52 is urged by the first resilient member 51. The first joint member 20 has a first supporting portion 21 at the first end thereof and a second supporting portion 22 at the second end thereof. The first supporting portion 21 is curved about the first axis of rotation C1 and the second supporting portion 22 is curved about the second axis of rotation C2 respectively. The first resilient member 51 has a first end supported in a recess 31 extending in the second joint member 30 and a second end supported on a first end of the first retainer 52. The first retainer 52 has a first retaining portion 521 at a second end thereof supported on the first supporting portion 21. The retaining device 50 also includes a second resilient member 53 and a second retainer 54 working cooperatively for preventing inadvertent relative movements between the first and the third joint members 20 and 40. The second retainer 54 is urged by the second resilient member 53. The second resilient member 53 has a first end supported in a recess 41 extending in the third joint member 40 and a second end supported on a first end of the second retainer 54. The second retainer 54 has a second retaining portion 541 at a second end thereof supported on the second supporting portion 22. The first and the second supporting portions 21 and 22 respectively form a first and a second curved surface. The retaining portion 521 forms a third curved surface corresponding to the first curved surface. The retaining portion 541 forms a fourth curved surface corresponding to the second curved surface.

The second and the third joint members 30 and 40 respectively have a first and a second joining end 35 and 45 to which a driving tool and an object to be driven are adapted to couple. The first joining end 35 is in a form of a cavity. The second joining end 45 is in a form of an extension which includes a detent retained therein. The first joining end 35*b* is in a form of a cavity. The second joining end 45*b* is in a form of an extension which includes a detent retained therein.

FIGS. 5-8 shows a universal joint head in accordance with a second embodiment of the present invention, and the same numbers are used to correlate similar components of the first embodiment, but bearing a letter a. A universal joint 10*a* includes a second and a third joint member 30*a* and 40*a* pivotally coupled to a first joint member 20*a*. The joint member 20*a* has a first supporting portion 21*a* at a first end thereof and a second supporting portion 22*a* at a second end thereof. The first supporting portion 21*a* forms a curved surface which corresponds to a curved surface of a first retaining portion 521*a*. The second supporting portion 22*a* forms a curved surface which corresponds to a curved surface of a second retaining portion 521*a*. The second embodiment differs from the first embodiment in that at least one of the first and the second retaining portions 521*a* and 541*a* has a first engaging structure 522*a* and 542*a* which forms first teeth protruding therefrom. Further, at least one of the first and the second supporting portions 21*a* and 22*a* has a first engaging structure 211*a* and 221*a* which forms second teeth protruding therefrom. The first and the second teeth of the first and the second engaging structures 211*a*, 221*a*, 522*a*, and 542*a* are engagable with each other for increasing retainability. When the first and the second teeth of the first engaging structure 522*a* and first engaging structure 211*a* are engaged, the first and the second joint members 20*a* and 30*a* are further retained and thus don't pivot relatively inadvertently. When the first and the second teeth of the first engaging structure 542*a* and first engaging structure 221*a* are engaged, the first and the third joint members 20*a* and 40*a* are further retained and thus don't pivot relatively inadvertently. The first teeth of the first engaging structure 522*a* and the second teeth of the first engaging structure 211*a* extend parallel to the first axis of rotation C1. The second teeth of the first engaging structure 542*a* and the second teeth of the second engaging structure 221*a* extend parallel to the second axis of rotation C2.

Figure 9:
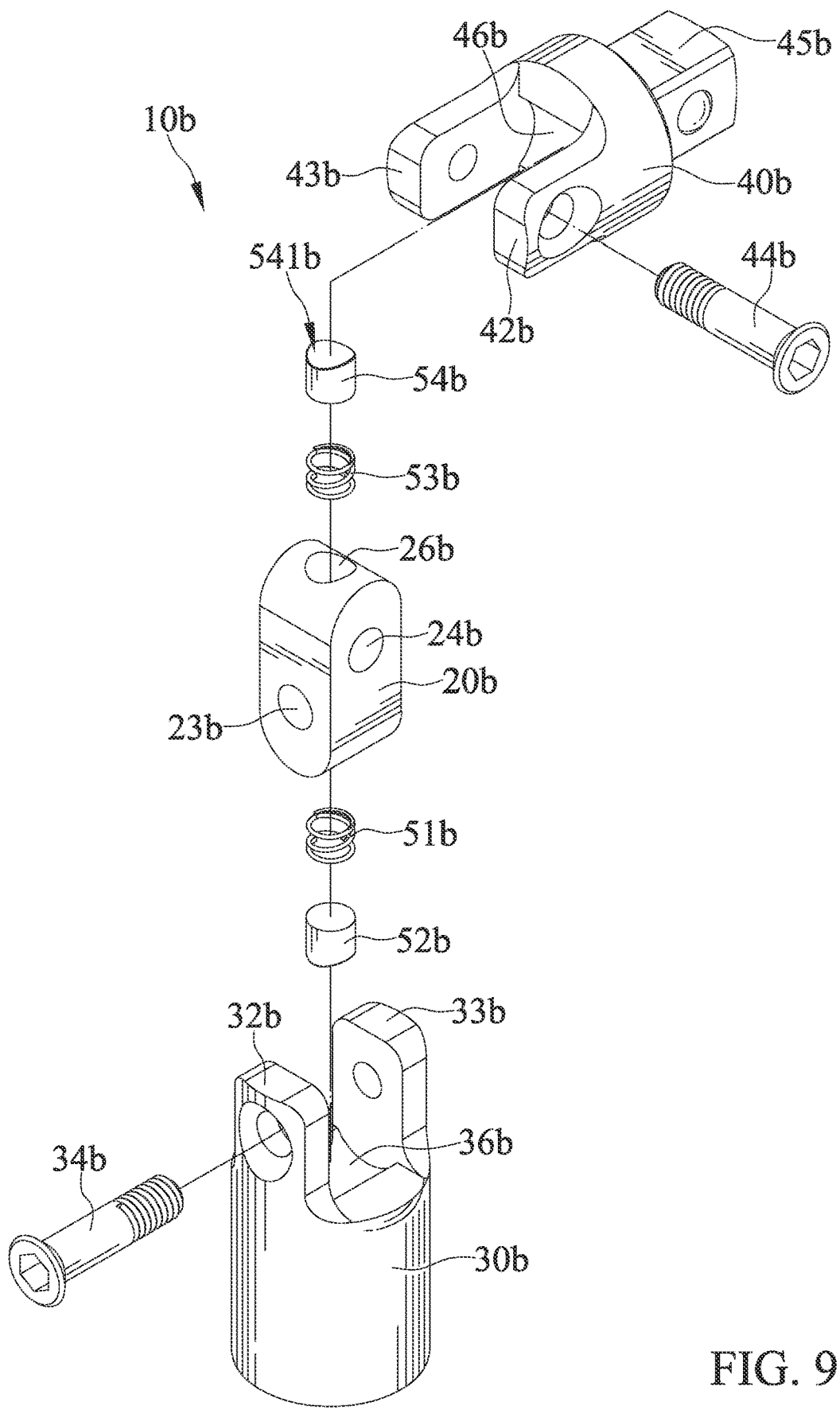
FIG. 9 is an exploded view of a universal joint in accordance with a third embodiment of the present invention.
Figure 10:
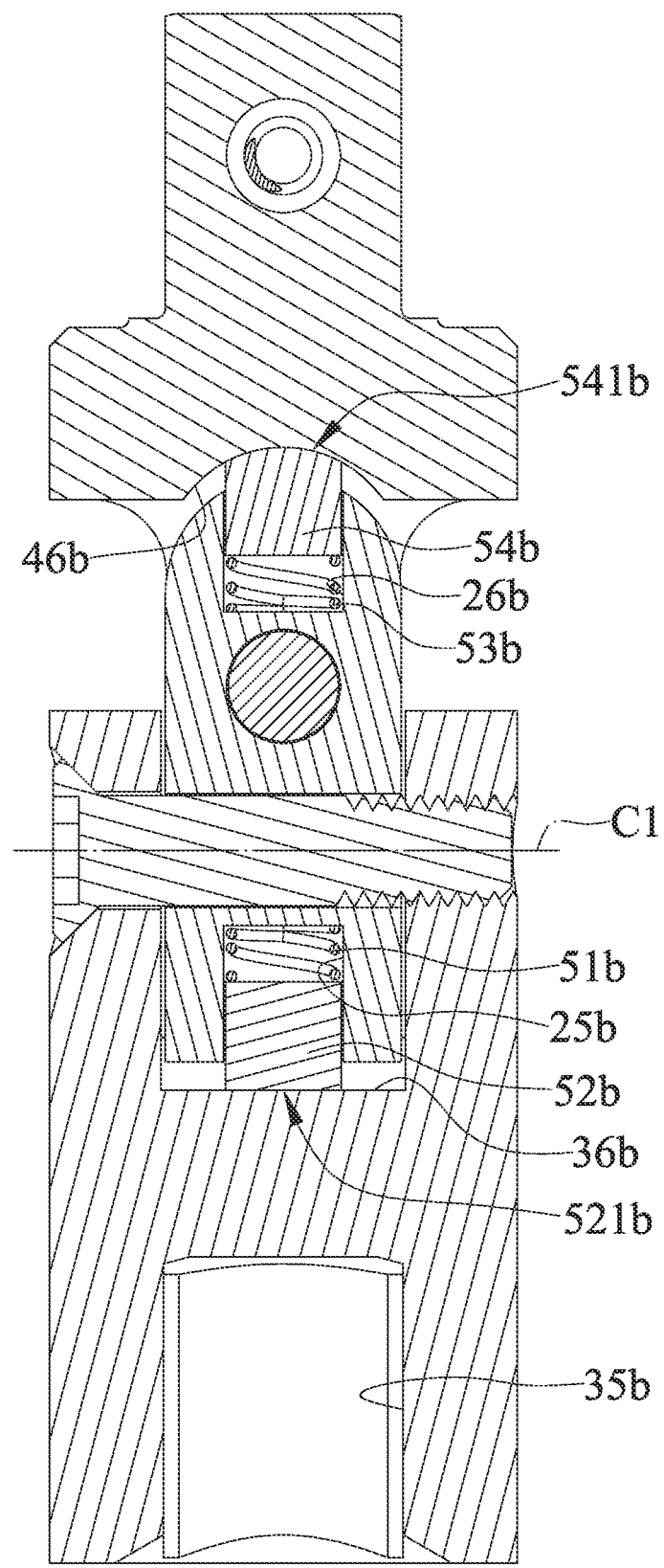
FIG. 10 is a cross-sectional view of the universal joint of FIG. 9.
Figure 11:
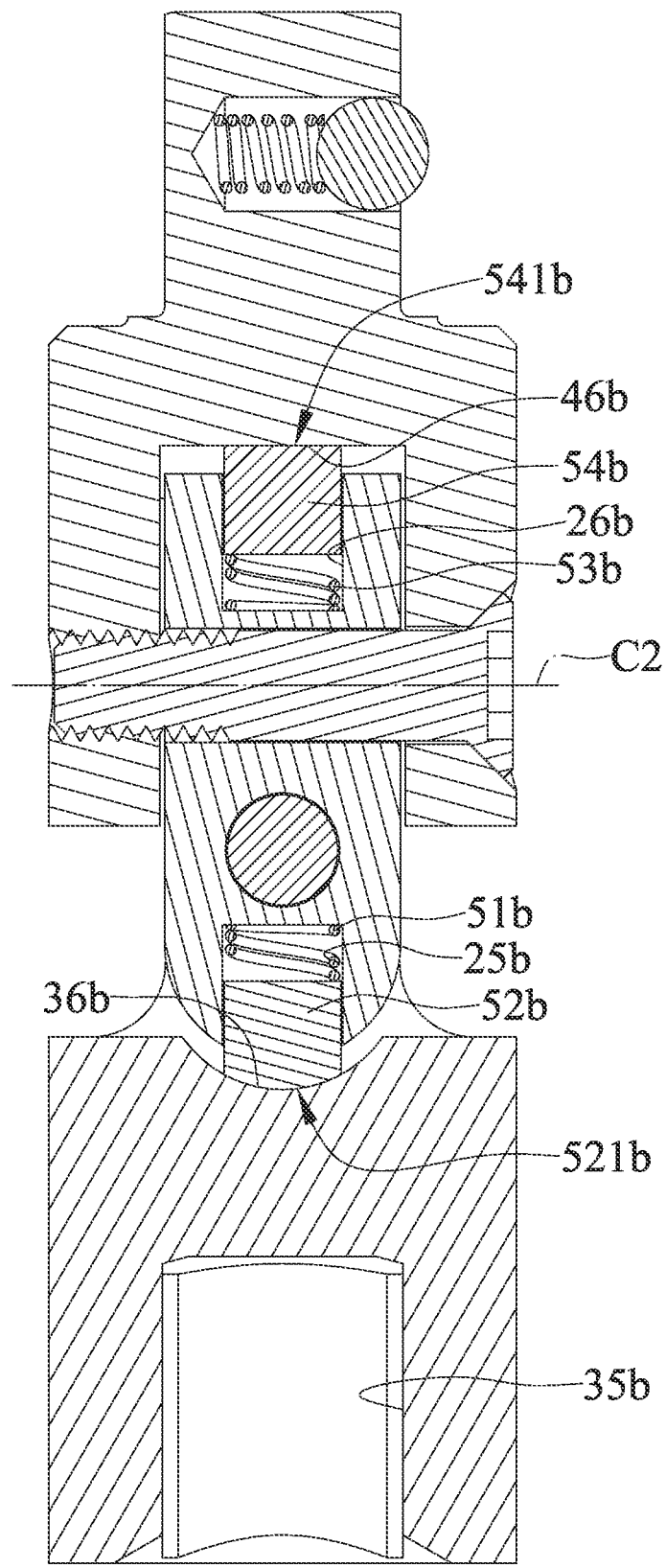
FIG. 11 is another cross-sectional view of the universal joint of FIG. 9.

FIG. 9 shows a universal joint head in accordance with a third embodiment of the present invention, and the same numbers are used to correlate similar components of the first embodiment, but bearing a letter b. A universal joint 10*b* includes a second and a third joint member 30*b* and 40*b* pivotally coupled to a first joint member 20*b*. The joint members 20*b* and 30*b* include a pivot 34*b*, which inserts in a hole 23*b*, connected therewith. The joint members 20*b* and 40*b* include a pivot 44*b*, which inserts in a hole 24*b*, connected therewith. The second joint member 30*b* has two lugs 32*b* and 33*b* and the first joint member 20 is partially disposed between the lugs 32*b* and 33*b*. The pivot 34*b* is inserted through one of two lugs 32*b* and 33*b*, the first joint member 20*b*, and into the other of two lugs 32*b* and 33*b*. The third joint member 30*b* has two lugs 42*b* and 43*b* and the first joint member 20*b* is disposed between the lugs 42*b* and 43*b*. The pivot 44*b* is inserted through one of two lugs 42*b* and 43*b*, the first joint member 20*b*, and into the other of two lugs 42*b* and 43*b*. The second and the third joint members 30*b* and 40*b* respectively have a first and a second joining end 35*b* and 45*b* to which a driving tool and an object to be driven are adapted to couple. A retaining device 50*b* which includes a first resilient member 51*b* and a first retainer 52*b*. The first retainer 52*b* is urged by the first resilient member 51*b*. The retaining device 50*b* also includes a second resilient member 53*b* and a second retainer 54*b*. The second retainer 54*b* is urged by the second resilient member 53*b*. The third embodiment differs from the first embodiment in that the first resilient member 51*b* has a first end supported in a first recess 25*b* extending in the first joint member 20*b* and a second end supported on a first end the first retainer 52*b*. The first retainer 52 has a first retaining portion 521*b* at a second end thereof supported on the second joint member 30*b*. Further, the second resilient member 53*b* has a first end supported in a second recess 26*b* extending in the first joint member 20*b* and a second end supported on a first end the second retainer 54*b*. The second retainer 54*b* has a second retaining portion 541*b* at a second end thereof supported on the third joint member 40*b*. The first and the second joint members 20*b* and 30*b* respectively form a first and a second curved surface at a first end thereof. The second joint member 30*b* has a first supporting portion 36*b* forming a third curved surface corresponding to the first curved surface. The third joint member 40*b* has a second supporting portion 46*b* forming a fourth curved surface corresponding to the second curved surface.

Figure 12:
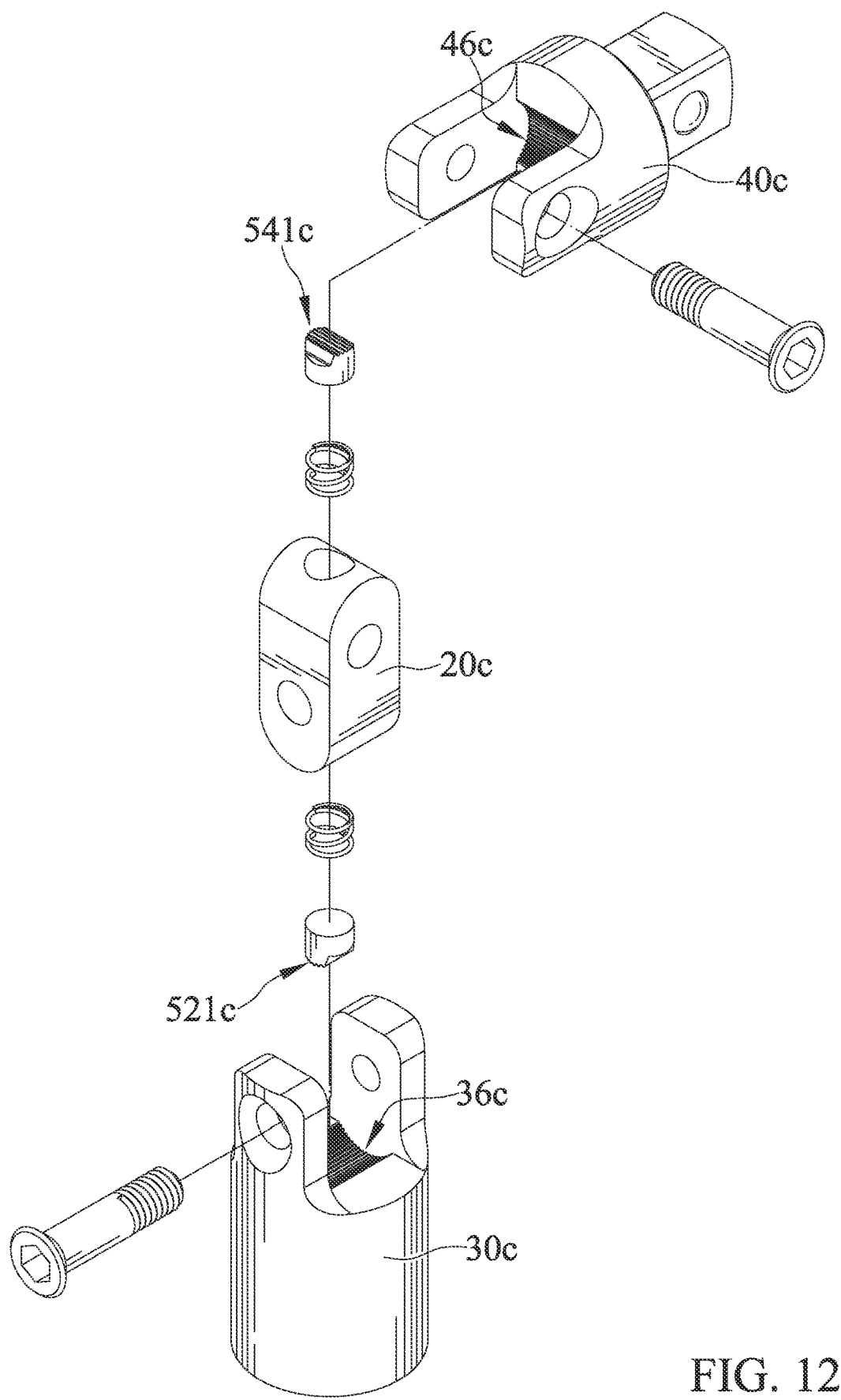
FIG. 12 is an exploded view of a universal joint in accordance with a fourth embodiment of the present invention.
Figure 13:
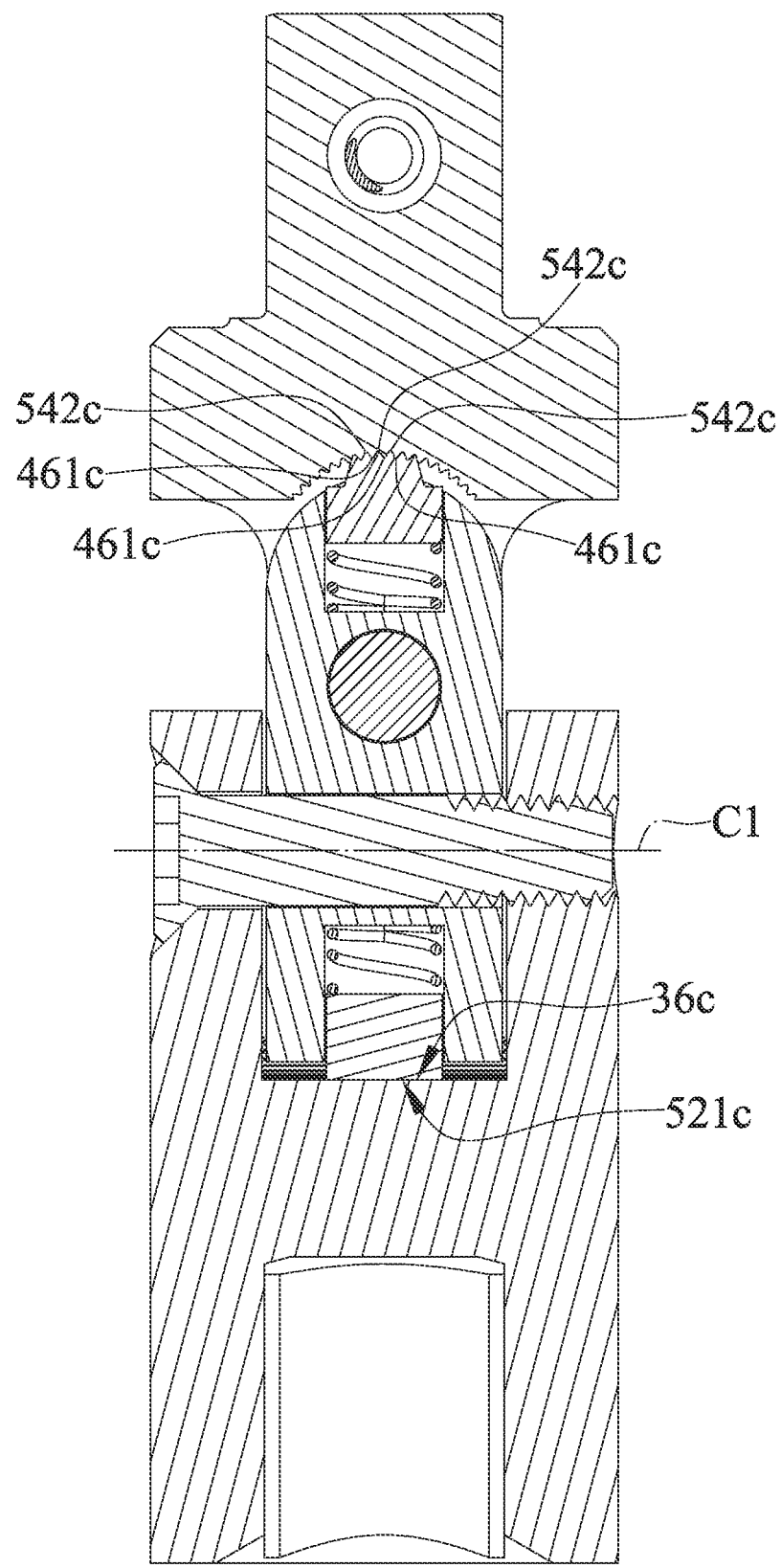
FIG. 13 is a cross-sectional view of the universal joint of FIG. 12.
Figure 14:
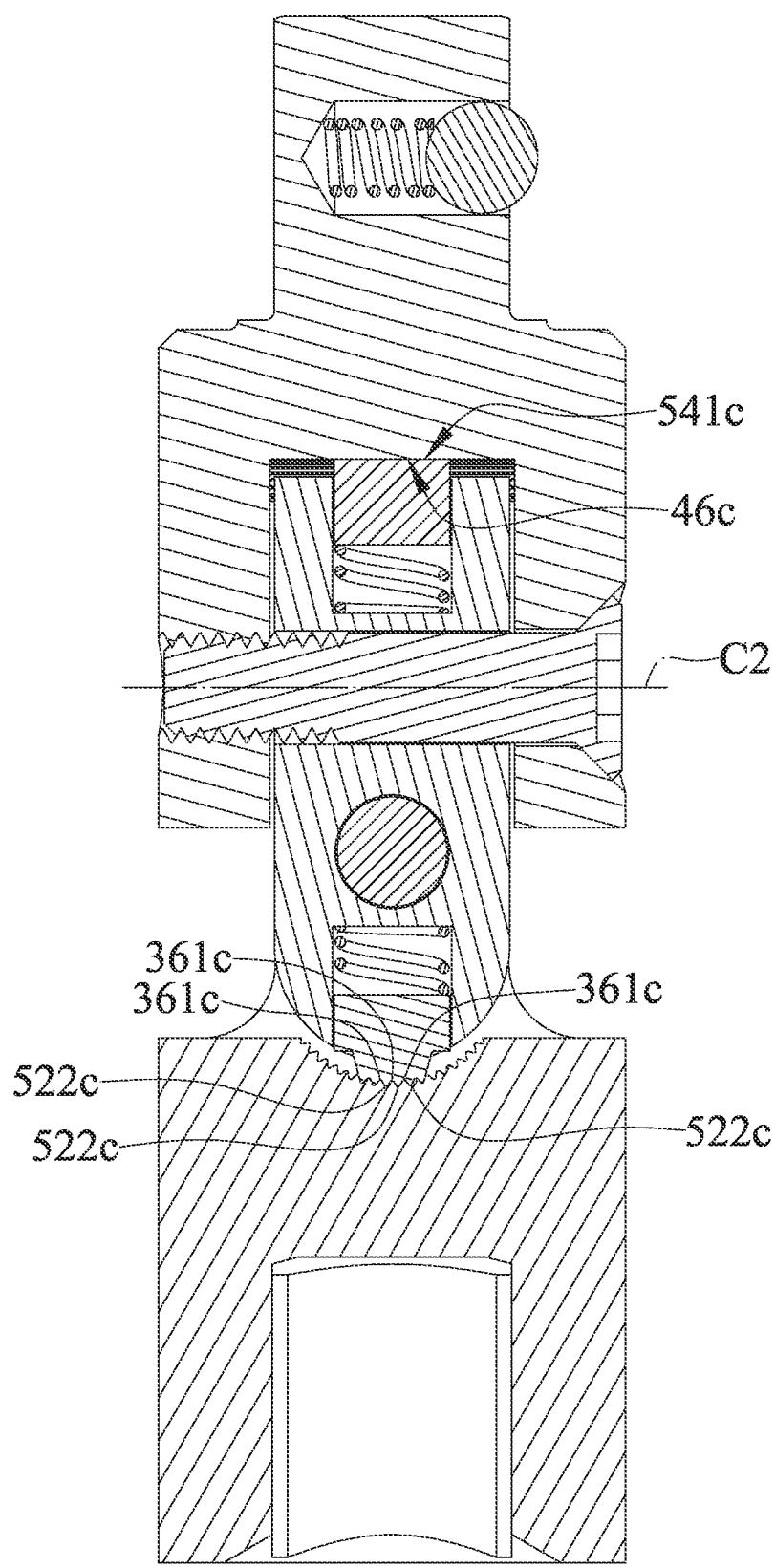
FIG. 14 is another cross-sectional view of the universal joint of FIG. 12.

FIGS. 12-14 shows a universal joint head in accordance with a fourth embodiment of the present invention, and the same numbers are used to correlate similar components of the first embodiment, but bearing a letter c. The fourth embodiment differs from the third embodiment in that at least one of a first and a second retaining portions 521*c* and 541*c* has a first engaging structure 522*c* and 542*c* which from first teeth protruding therefrom. Further, at least one of a first and a second supporting portion 36c and 46c has a second engaging structure 361c and 461c which forms second teeth protruding therefrom. The first and the second teeth of the first and the second engaging structures 522c, 542c, 361c, and 461c are engageable with each other. When the first and the second teeth of the first engaging structure 522c and first engaging structure 361c are engaged, the first and the second joint members 20c and 30c are further retained and thus don't pivot relatively inadvertently. When the first and the second teeth of the first engaging structure 542c and first engaging structure 461c are engaged, the first and the third joint members 20c and 40c are further retained and thus don't pivot relatively inadvertently. The first teeth of the first engaging structure 522c and the second teeth of the first engaging structure 361c extend parallel to the first axis of rotation C1. The second teeth of the first engaging structure 542c and the second teeth of the second engaging structure 461c extend parallel to the second axis of rotation C2.

The foregoing is merely illustrative of the principles of this invention and various modifications can be made by those skilled in the art without departing from the scope and spirit of the invention.

What is claimed is:

1. A universal joint comprising:
   a first joint member having a first end to which a second joint member is coupled and a second end to which a third joint member is coupled, wherein the first and the second joint members are pivotally connected with each other about a first axis of rotation, wherein the first and third joint members are pivotally connected with each other about a second axis of rotation, and a retaining device which includes a first resilient member and a first retainer working cooperatively for preventing inadvertent relative movements between the first and the second joint members, wherein the first joint member has a first supporting portion at the first end thereof, wherein the first retainer has a first retaining portion at a second end thereof supported on the first supporting portion, wherein the first supporting portion forms a first curved surface being convex and the first retaining portion forms a second curved surface being concave and corresponding to the first curved surface, and wherein the first retainer is urged by the first resilient member.

2. The universal joint as claimed in claim 1, wherein the retaining device includes a second resilient member and a second retainer working cooperatively for preventing inadvertent relative movements between the first and the third joint members, and wherein the second retainer is urged by the second resilient member.

3. The universal joint as claimed in claim 2, wherein the first joint member has a second supporting portion at the second end thereof wherein the second resilient member has a first end supported in a second recess extending in the third joint member and a second end supported on a first end of the second retainer, wherein the second retainer has a second retaining portion at a second end thereof supported on the second supporting portion, wherein the second supporting portion forms a third curved surface, and wherein the second retaining portion forms a fourth curved surface corresponding to the third curved surface.

4. The universal joint as claimed in claim 3, wherein at least one of the first and the second retaining portions has a first engaging structure which forms first teeth protruding therefrom, wherein at least one of the first and the second supporting portions has a first engaging structure which forms second teeth protruding therefrom, and wherein the first and the second teeth of the first and the second engaging structures are engageable with each other for increasing retainability.

5. The universal joint as claimed in claim 4, wherein the first and the second axes of rotation extend on the first joint member at different heights and in different directions, and wherein the first supporting portion is curved about the first axis of rotation and the second supporting portion is curved about the second axis of rotation respectively.

6. The universal joint as claimed in claim 5, wherein the first teeth of the first engaging structure and the second teeth of the first engaging structure extend parallel to the first axis of rotation, and wherein the second teeth of the first engaging structure and the second teeth of the second engaging structure extend parallel to the second axis of rotation.

7. The universal joint as claimed in claim 4, wherein the first teeth of the first engaging structure and the second teeth of the first engaging structure extend parallel to the first axis of rotation, and wherein the second teeth of the first engaging structure and the second teeth of the second engaging structure extend parallel to the second axis of rotation.

8. The universal joint as claimed in claim 1, wherein the first and the second axes of rotation extend on the first joint member at different heights and in different directions, and wherein the first supporting portion is curved about the first axis of rotation and the second supporting portion is curved about the second axis of rotation respectively.

9. A universal joint, comprising:
   a first joint member having a first end to which a second joint member is coupled and a second end to which a third joint member is coupled, wherein the first and the second joint members are pivotally connected with each other about a first axis of rotation, wherein the first and third joint members are pivotally connected with each other about a second axis of rotation, and a retaining device which includes a first resilient member and a first retainer working cooperatively for preventing inadvertent relative movements between the first and the second joint members, wherein the first joint member has a first supporting portion at the first end thereof, wherein the first resilient member has a first end supported in a first recess extending in the second joint member and a second end supported on a first end of the first retainer, wherein the first retainer has a first retaining portion at a second end thereof supported on the first supporting portion, wherein the first supporting portion forms a first curved surface, wherein the first retaining portion forms a second curved surface corresponding to the first curved surface, wherein the first retainer and the first recess are cylindrical, and wherein the first retainer has no diameter greater than a diameter of the first recess.

10. The universal joint as claimed in claim 9, wherein the second and the third joint members respectively have a first and a second joining end to which a driving tool and an object to be driven are adapted to couple.

11. The universal joint as claimed in claim 9, wherein the first and the second axes of rotation extend on the first joint member at different heights and in different directions, and wherein the first supporting portion is curved about the first axis of rotation and the second supporting portion is curved about the second axis of rotation respectively.

12. A universal joint comprising:
   a first joint member having a first end to which a second joint member is coupled and a second end to which a third joint member is coupled, wherein the first and the second joint members are pivotally connected with each other about a first axis of rotation, wherein the first and third joint members are pivotally connected with each other about a second axis of rotation, and a retaining device which includes a first resilient member and a first retainer working cooperatively for preventing inadvertent relative movements between the first and the second joint members, wherein the first resilient member has a first end supported in a first recess extending in the first joint member and a second end supported on a first end of the first retainer, wherein the first retainer has a first retaining portion at a second end thereof supported on the second joint member, wherein the first joint member has a first end forming a first curved surface, wherein the second joint member has a first supporting portion forming a second curved surface corresponding to the first curved surface, wherein the first retainer and the first recess are cylindrical, and wherein the first retainer has no diameter greater than a diameter of the first recess.

13. The universal joint as claimed in claim 12, wherein the retaining device includes a second resilient member and a second retainer working cooperatively for preventing inadvertent relative movements between the first and the third joint members, wherein the second retainer is urged by the second resilient member, wherein the second resilient member has a first end supported in a second recess extending in the first joint member and a second end supported on a first end the second retainer, wherein the second retainer has a second retaining portion at a second end thereof supported on the third joint member, wherein the first and the second joint members respectively form a first and a second curved surface at a first end thereof, wherein the second joint member has a first supporting portion forming a third curved surface corresponding to the first curved surface, and wherein the third joint member has a second supporting portion forming a fourth curved surface corresponding to the second curved surface.

14. The universal joint as claimed in claim 13, wherein at least one of the first and the second retaining portions has a first engaging structure which form first teeth protruding therefrom, wherein at least one of the first and the second supporting portion has a second engaging structure which forms second teeth protruding therefrom, and wherein the first and the second teeth of the first and the second engaging structures are engageable with each other.

15. The universal joint as claimed in claim 14, wherein the first and the second axes of rotation extend on the first joint member at different heights and in different directions, and wherein the first supporting portion is curved about the first axis of rotation and the second supporting portion is curved about the second axis of rotation respectively.

16. The universal joint as claimed in claim 15, wherein the first teeth of the first engaging structure and the second teeth of the first engaging structure extend parallel to the first axis of rotation, and wherein the second teeth of the first engaging structure and the second teeth of the second engaging structure extend parallel to the second axis of rotation.

17. The universal joint as claimed in claim 13, wherein the first and the second axes of rotation extend at different heights and in different directions.

18. The universal joint as claimed in claim 14, wherein the first teeth of the first engaging structure and the second teeth of the first engaging structure extend parallel to the first axis of rotation, and wherein the second teeth of the first engaging structure and the second teeth of the second engaging structure extend parallel to the second axis of rotation.

19. The universal joint as claimed in claim 12, wherein the first and the second axes of rotation extend on the first joint member at different heights and in different directions.

* * * * *